United States Patent
Kurz et al.

[11] 3,715,219
[45] Feb. 6, 1973

[54] ELECTROSTATICALLY IMPROVEMENT IN ELECTO STATIC PRINTING

[75] Inventors: Philip F. Kurz, Columbus, Ohio; Leonard A. Nash, Lake Forest, Ill.

[73] Assignee: Teletype Corporation, Skokie, Ill.

[22] Filed: Sept. 23, 1969

[21] Appl. No.: 860,387

[52] U.S. Cl. ............... 106/22, 106/31, 106/272, 117/93.4, 252/62.1, 346/1
[51] Int. Cl. ................................................. C09d 11/00
[58] Field of Search ............... 106/309, 272, 19–32, 106/308; 117/93.4; 204/165, 167; 346/1; 252/62.1

[56] References Cited

UNITED STATES PATENTS

| | | | |
|---|---|---|---|
| 2,324,671 | 7/1943 | Bernstein | 106/29 |
| 2,823,138 | 2/1958 | Hoffman | 106/311 |
| 2,882,172 | 4/1959 | Scobel | 106/22 |
| 2,344,671 | 3/1944 | Bertsch | 8/93 |
| 2,772,982 | 12/1956 | Vesce | 106/272 |

FOREIGN PATENTS OR APPLICATIONS

| | | | |
|---|---|---|---|
| 395,225 | 7/1933 | Great Britain | 106/23 |
| 418,074 | 10/1934 | Great Britain | 106/22 |
| 584,219 | 1/1947 | Great Britain | 8/93 |
| 1,914,208 | 11/1970 | Germany | 106/309 |

Primary Examiner—Joan B. Evans
Attorney—J. L. Landis and R. P. Miller

[57] ABSTRACT

An ink having a resistivity in the range of $10^6$ to $10^{11}$ ohm-centimeters and a viscosity in a range with an upper limit of about 50 centipoises synchronously is formed into a uniform succession of ink drops in response to an alternating current. A stream of the ink drops is electrostatically drawn across and deflected in a span between the ink source and a carrier for printing thereon by drop impingement. The ink is a composition having about 3 percent by weight of a dye material and the remainder a vehicle comprised of at least one alcohol of the paraffin series which has the general formula $CH_3(CH_2)_nCH_2OH$ in which $n$ is an integer between 12 and 16.

4 Claims, 1 Drawing Figure

PATENTED FEB 6 1973 3,715,219
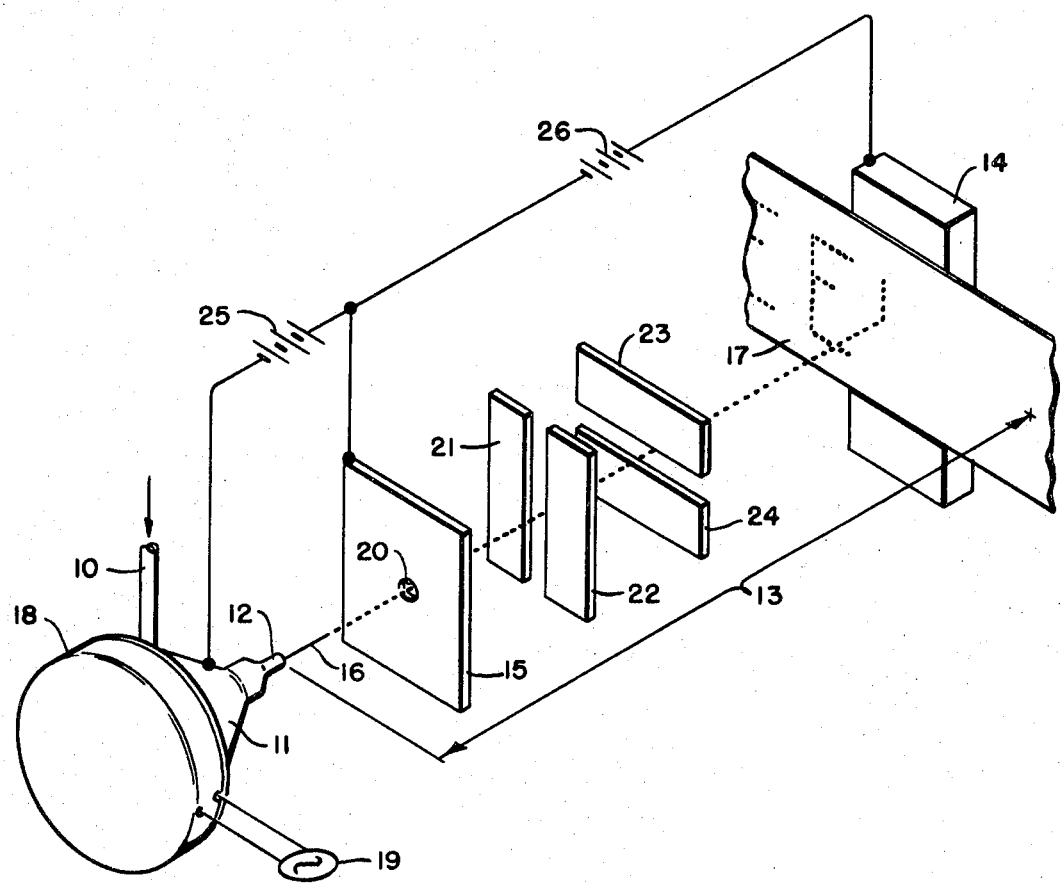
INVENTORS
PHILIP F. KURZ
LEONARD A. NASH
BY Sherman P. Appel
ATTORNEY

ELECTROSTATICALLY IMPROVEMENT IN ELECTO STATIC PRINTING

BACKGROUND OF THE INVENTION

This invention relates to electrostatic printing. Particularly it relates to printing with an ink which electrostatically is moved across and deflected in a span between an ink supply source and a record carrier for forming intelligence patterns thereon. Specifically it relates to an electrostatic printing process in which the writing material comprises a stream of synchronously formed ink drops.

The general art of electrostatically moving a stream of ink drops for writing has been the subject of considerable investigation. This art may be considered in two classes referred to as asynchronous and synchronous jet printing according to not or whether drops in a printing stream are generated synchronously with and in response to a contrived alternating disturbance and calculated to be of equal diameter and equally spaced. The former class is exemplified by U.S. Pat. No. 3,060,429 issued to C. R. Winston, Oct. 23, 1962, said patent also being illustrative of the general state of the art. The latter class is exemplified by copending application of C. R. Winston, Ser. No. 681,677 filed Nov. 9, 1967, and assigned to the assignee of the present application, now U.S. Pat. No. 3,484,794, issued Dec. 16, 1969.

A dearth of literature available as regards inks which can be effectively transferred according to prior teachings tends to limit practice of the art generally and synchronous jet printing specifically, because many, if not most, compositions which might be considered suitable in the art will not produce commercially satisfactory graphic products when used in heretofore known apparatuses. The inadequacy of such compositions results from absence of physical and electrical properties compatible with known processes.

In the copending application of R. J. Dunlavey and C. R. Winston, Ser. No. 513,196, filed Dec. 13, 1965, now abandoned, in favor of a continuation-in-part application, Ser. No. 853,825, filed Aug. 28, 1969, and assigned to the assignee of the present application, parameters of viscosity and resistivity of inks in a liquid phase suitable in the referenced art generally are set forth. However, even such suitable inks vary widely in effectiveness in a synchronous jet printing process according to their levels of responsiveness to disturbances applied for producing stream alternations or vibrations.

Accordingly, the principal objects of this invention are to improve synchronous jet printing and to provide a readily transferrable effective ink for such printing.

SUMMARY OF THE INVENTION

According to one aspect of the invention, a process wherein a printing medium, comprised of a stream of synchronously formed drops of an ink which electrostatically is transferred across and deflected in a span between an ink supply and a carrier on which the drops impinge for forming record patterns, is characterized by the vehicle for the ink. The vehicle is alcohol of the paraffin series and has the general formula $CH_3(CH_2)_n CH_2OH$ in which $n$ is an integer of 12 to 16. In another aspect of the invention, the vehicle is solid at room temperature and proportioned such that the ink has a resistivity within the range of about $10^6$ to about $10^{11}$ ohm-centimeters and a viscosity in a range with an upper limit of about 50 centipoises when in a liquid phase.

DESCRIPTION OF THE DRAWING

The ensuing detailed description of the invention refers to the accompanying drawing which is a perspective of a scheme for effecting a process embodying one aspect of the invention.

DETAILED DESCRIPTION OF THE INVENTION

Referring now to the drawing, shown is electrostatic printing apparatus of the general type disclosed in said Winston patent. Ink in a fluid phase is supplied at a constant flow rate from a source represented by a supply tube 10 to a reservoir 11 which terminates in a nozzle 12 with a capillary bore. Exemplary reservoir 11 and nozzle 12 may be a unitary construction and are of electrically conductive material.

Ink issuing from the nozzle forms a convex maniscus resulting from the hydrostatic pressure in the system and is electrostatically drawn across and deflected in a span 13 between the nozzle and a platen 14. Ink movement toward the platen results from an electrostatic field into which the ink protrudes and generated by applying a high potential difference between the nozzle and said platen.

Initial acceleration and control of the ink flow from nozzle 12 in an upstream part of the electrostatic field is effected by an accelerating or valving electrode 15 which is comparable to the single valving electrode disclosed in the aforementioned Winston patent. It is maintained at a positive d-c potential relative the potential on nozzle 12 by means of a d-c power supply, such as battery 25, and at level of sufficient magnitude to create a strong accelerating field, but without causing the jet stream 16 which is formed, to disperse.

In a manner heretofore known in the art, the stream breaks into a succession of droplets which impinge for printing on a flexible carrier 17 which herein is paper of sheeting thickness and movably supported along platen 14. To the end that the drops will be generated uniformly and be of uniform size and spacing, a uniformly alternating disturbance is applied to the stream to induce a wave or pulsation therein. While any heretofore known process may be employed for that purpose, herein the stream is mechanically modulated by a pulsating or alternating transducer 18 supported adjacent reservoir 11 and responsive to an alternating current provided from a generator 19. By adjusting generator output, droplet formation at a selected and uniform frequency and synchronously with the frequency of the output will be effected, provided a suitable ink is employed.

Electrode 15 is in the form of a plate with a central aperture 20 horizontally aligned with the tip of nozzle 12 and defines the path of stream 16. After the ink droplets pass through said last electrode they can be deflected vertically and horizontally according to the disclosure in the aforementioned Winston patent. Herein control of stream deflection results from deflection potentials applied to a pair of horizontal-deflection electrodes 21 and 22 and a pair of vertical-deflection electrodes 23 and 24 which are suitably disposed about and define the path of stream 16 downstream of electrode 15. Both sets of said deflection electrodes are adapted for application thereto of components of d-c potentials which are more positive than the potential present on accelerating electrode 15 to the end that the ink droplets, after passing the accelerating electrode, can be further accelerated. Deflection signals may be superimposed on these d-c components for directing the ink droplets toward selected areas of platen 14 from, for example, a coded output (not shown) which forms no part of the present invention.

To produce proper droplet movement, platen 14 in turn is maintained at a potential which is more positive than the d-c potential applied to the deflection electrodes and from a suitable source of d-c potential, such as a battery 26 which is connected between accelerating electrode 15 and said platen.

Chamber 11 of the exemplary apparatus is maintained at a temperature in the range of between about 62° C and 82° C during the preferred process. The diameter of the bore of nozzle 12 of the exemplary apparatus is 0.0045 inch. Electrode 15 is spaced 0.060 inch downstream from the nozzle tip and 0.110 inch upstream of horizontal deflection electrodes 21 and 22. The latter are horizontally spaced 0.030 inch each from the other and 0.110 inch upstream of the vertical deflection electrodes 23 and 24. These are vertically spaced 0.030 inch each from the other and 0.685 inch upstream of the platen.

The illustrated apparatus will operate effectively when a d-c potential of −3,750 volts is applied to the nozzle, a d-c potential of 15,000 volts is applied to the platen, a d-c potential of −600 volts is applied to electrode 15, a nondeflecting d-c potential of 600 volts is applied to electrodes 21 and 22, and a non-deflecting potential of 1,800 volts is applied to electrodes 23 and 24. Maximum deflection vertically and horizontally may be effected by varying the potential between electrodes of each pair by about 600 volts.

The described apparatus is adapted to print alphanumeric characters of fine definition and maximum complexity and having 0.088 inch in height and 0.072 in width in a matrix of 0.124 inch high by 0.1 inch wide (10 characters per inch) at the rate of 3,600 per minute.

We have found that certain waxy alcohols of the paraffin series, provide excellent vehicles for coloring matter for producing high quality printing in a synchronous jet process. Each thereof imparts to the ink in a liquid phase and at temperature at which the ink is drawn from the nozzle the desired characteristics of viscosity and resistivity. That is to say, at such temperature, the ink has a viscosity in a range having an upper limit of 50 centipoises and a resistivity in the range of $10^6$ to $10^{22}$ ohm-centimeters. Moreover, each causes the ink to be unusually highly responsive to alternating current in the sense that it will readily vibrate, pulsate or form a wave having a frequency synchronous with the preferred current frequency of 21,000 cycles per second to form a succession of drops for electrostatic transfer according to the process.

These compounds have the general formula: $CH_3(CH_2)_nCH_2OH$ in which $n$ is an integer of 12 to 16. Moreover, these alcohols provide excellent hot melt type inks which have a preferred melting point which does not exceed about 61° C and a freezing point which is not below about 30° C. This insures that the ink will be in a liquid phase at operating temperature of chamber 11, and will be solid at generally encountered room temperatures.

Specific inks according to the invention are set forth in the following:

EXAMPLE I

| Ingredients | % by weight |
|---|---|
| 1-tetradecanol | 97% |
| C.I. solvent black 12 | 2% |
| C.I. solvent yellow 29 | 1% |

EXAMPLE II

| | |
|---|---|
| 1-hexadecanol | 97% |
| C.I. solvent black 12 | 2% |
| C.I. solvent yellow 29 | 1% |

EXAMPLE III

| | |
|---|---|
| 1-octadecanol | 97% |
| C.I. solvent black 12 | 2% |
| C.I. solvent yellow 29 | 1% |

The exemplary inks have the properties set forth in the table following:

| | INKS | | |
|---|---|---|---|
| Properties | Example I | Example II | Example III |
| melting point in degrees C. | 37.6 | 49.6 | 58 |
| Resistivity in ohm-centimeters at 80°C. | $2.6 \times 10^8$ | $3.7 \times 10^8$ | $2.1 \times 10^8$ |
| Viscosity in centipoises at 80°C. | 4.0 | 5.0 | 5.9 |

As used herein the term "printing" is not limited to intelligence formation by alphanumeric symbols but includes any graphic representation in the form of, for example, script and other pattern and symbol formation. The term "ink" means any material with which printing can be effected. The term "hot melt" defines ink and means in a solid phase at room temperature and in a liquid phase at some higher temperature, generally, to enable flow during transfer to a carrier.

We claim:

1. In an ink-jet printing process wherein an ink stream is formed into a succession of printing drops, the improvement characterized by a hot melt ink composition vibratile in a fluid phase synchronously with an alternating current for printing electrostatically, the ink composition consisting essentially of a dye material in an amount of not more than 3 percent by weight and a vehicle selected from a class of compounds having the general formula $CH_3(CH_2)_nCH_2OH$ in which $n$ is an integer between 12 and 16.

2. A combination according to claim 1 wherein the ink constituents are proportioned such that, in the fluid phase, the viscosity of the ink is in a range having an upper limit of 50 centipoises and the resistivity of the ink is in the range of $10^6$ to $10^{11}$ ohm-centimeters.

3. A combination according to claim 2 wherein the dye material is black.

4. A combination according to claim 1 wherein the vehicle comprises at least one substance selected from the class consisting of 1-tetradecanol, 1-hexadecanol, and 1-octadecanol.

* * * * *